United States Patent
Choi

(10) Patent No.: US 10,324,703 B2
(45) Date of Patent: Jun. 18, 2019

(54) TERMINAL, VEHICLE, AND METHOD FOR CONTROLLING THE SAME

(71) Applicant: HYUNDAI MOTOR COMPANY, Seoul (KR)

(72) Inventor: Hyunwoo Choi, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/092,218

(22) Filed: Apr. 6, 2016

(65) Prior Publication Data

US 2017/0123782 A1  May 4, 2017

(30) Foreign Application Priority Data

Oct. 29, 2015  (KR) .................. 10-2015-0150970

(51) Int. Cl.
G06F 8/65 (2018.01)
G06F 9/4401 (2018.01)

(52) U.S. Cl.
CPC .............. *G06F 8/65* (2013.01); *G06F 9/4418* (2013.01); *Y02D 10/42* (2018.01); *Y02D 10/44* (2018.01)

(58) Field of Classification Search
None
See application file for complete search history.

(56) References Cited

U.S. PATENT DOCUMENTS

| | | | | |
|---|---|---|---|---|
| 8,768,537 B2* | 7/2014 | Kim | .......................... | H04Q 9/00 701/2 |
| 8,793,677 B2* | 7/2014 | Harada | ................. | G06F 1/3203 717/168 |

(Continued)

FOREIGN PATENT DOCUMENTS

| | | |
|---|---|---|
| JP | 2014041456 A | 3/2014 |
| KR | 10-2006-0129312 A | 12/2006 |

(Continued)

OTHER PUBLICATIONS

Jurkovic et al. "Remote firmware update for constrained embedded systems." Information and Communication Technology, Electronics and Microelectronics. IEEE, 2014. Retrieved on [Jan. 29, 2019] Retrieved from the Internet:URL<https://ieeexplore.ieee.org/abstract/document/6> (Year: 2014).*

(Continued)

*Primary Examiner* — Thuy Dao
*Assistant Examiner* — Cheneca Smith
(74) *Attorney, Agent, or Firm* — Morgan, Lewis & Bockius LLP

(57) ABSTRACT

A terminal, a vehicle, and a method for controlling the same are disclosed, which can perform a remote service mode upon receiving a Firmware Over The Air (FOTA) update notification message during a standby mode, and at the same time can download only the update file needed for the update function, such that power consumption can be reduced in the standby mode. When the standby mode is switched to a normal mode, the embodiments can update the corresponding software using the downloaded file, such that the number of update non-execution times caused by non-reception of the update notification message can be minimized. The embodiments can automatically access the server at a predetermined time during a normal mode so as to confirm the presence or absence of software to be updated, and can update the confirmed software, such that the embodiments can also normally update another software package.

23 Claims, 9 Drawing Sheets

(56) References Cited

U.S. PATENT DOCUMENTS

| | | | |
|---|---|---|---|
| 9,128,798 B2* | 9/2015 | Hoffman | G06F 8/65 |
| 2009/0300595 A1* | 12/2009 | Moran | G06F 8/65 |
| | | | 717/170 |
| 2010/0120373 A1* | 5/2010 | Wheatley | G07C 5/008 |
| | | | 455/68 |
| 2011/0035739 A1* | 2/2011 | Harada | G06F 1/3203 |
| | | | 717/168 |
| 2012/0214417 A1* | 8/2012 | Woo | G06F 1/3209 |
| | | | 455/41.2 |
| 2013/0047145 A1* | 2/2013 | Cui | G06F 8/65 |
| | | | 717/168 |
| 2013/0143402 A1* | 6/2013 | Chu | H01L 21/02697 |
| | | | 438/658 |
| 2014/0245278 A1* | 8/2014 | Zellen | G06F 8/65 |
| | | | 717/170 |
| 2014/0304700 A1* | 10/2014 | Kim | G06F 8/65 |
| | | | 717/173 |
| 2015/0007155 A1* | 1/2015 | Hoffman | G06F 8/65 |
| | | | 717/168 |
| 2015/0347117 A1* | 12/2015 | Tokunaga | H04L 67/02 |
| | | | 717/173 |
| 2015/0355703 A1* | 12/2015 | Macdonald | G06F 1/3246 |
| | | | 701/36 |

FOREIGN PATENT DOCUMENTS

| | | |
|---|---|---|
| KR | 10-2010-0072781 A | 7/2010 |
| KR | 10-2010-0074527 A | 7/2010 |
| KR | 10-2012-0019870 A | 3/2012 |
| KR | 10-1431265 B1 | 8/2014 |
| KR | 10-2015-0074413 A | 7/2015 |
| KR | 2015-0089591 A | 8/2015 |

OTHER PUBLICATIONS

Nakanishi et al. "A software update scheme by airwaves for automotive equipment." Informatics, Electronics & Vision (ICIEV), 2013 International Conference on. IEEE, 2013. Retrieved on [Jan. 29, 2019] Retrieved from the Internet:URL<https://ieeexplore.ieee.org/abstract/document/6572709> (Year: 2013).*

* cited by examiner

TERMINAL, VEHICLE, AND METHOD FOR CONTROLLING THE SAME

CROSS-REFERENCE TO RELATED APPLICATION

This application claims the benefit of priority to Korean Patent Application No. 10-2015-0150970, filed on Oct. 29, 2015 in the Korean Intellectual Property Office, the disclosure of which is incorporated herein by reference.

TECHNICAL FIELD

Embodiments of the present disclosure relate to a terminal for updating software, a vehicle and a method for controlling the same.

BACKGROUND

Generally, a terminal (e.g., user equipment (UE)) may perform various functions (for example, a navigation function, a telephone function, an audio function, a radio function, a broadcast function, a text message service, an Internet function, etc.), and may update software for performing at least one function.

If terminal (or UE) software is updated using mobile communication, unnecessary costs are incurred. If the terminal (or UE) downloads and updates data using a universal serial bus (USB) or Secure Digital (SD) card, it takes a user long time to download and update data, resulting in greater inconvenience of use.

With development of automobile technology, recent vehicles embedded with a terminal (or UE) have more various and complex functions. In addition, various kinds of software to realize various and complex functions are also provided.

In particular, a software upgrade rate based on the addition of new functions and error correction have been increased, which causes user inconvenience.

Generally, in order to upgrade vehicle software, a vehicle owner directly visits a service center. In order to directly update the vehicle software, on the other hand, the vehicle owner may access a home page related to the vehicle to check and download software corresponding to model and manufacture year of the vehicle and then install the downloaded software, which is inconvenient.

In general, a version for vehicle software upgrade is provided per quarter. As a result, the vehicle owner stores the downloaded software for updating in a portable storage medium, such as a universal serial bus (USB) memory, connects the portable storage medium to the vehicle, and drives a predetermined application for software update to perform software upgrade, resulting in greater inconvenience of use.

In addition, map data for navigation must be periodically updated quarterly. When the map data is updated, the vehicle owner must detach a portable storage medium (such as a USB) from the vehicle and connect the portable storage medium to the vehicle, resulting in greater inconvenience of use.

In particular, the map data has a large size of 4 gigabytes (GB) to 5 GB. According to types, data having a size of 10 GB or more are present. For this reason, it may take long time to download map data from the Internet home page.

If the vehicle is turned off, the vehicle does not receive an update notification message from the server, such that it is impossible to update the corresponding software.

SUMMARY

Therefore, it is an aspect of the present disclosure to provide a terminal for downloading an update file needed for software update upon receiving an update notification message during a standby mode, and updating software using the downloaded file during a normal mode, a vehicle including the terminal therein and a method for controlling the vehicle.

It is another aspect of the present disclosure to provide a terminal for accessing a server when a current time of a normal mode is a predetermined time so as to confirm the presence or absence of software to be updated, downloading an update file of the confirmed software, and updating the software, a vehicle including the terminal therein, and a method for controlling the vehicle.

Additional aspects of the disclosure will be set forth in part in the description which follows and, in part, will be obvious from the description, or may be learned by practice of the disclosure.

In accordance with an aspect of the present disclosure, a terminal includes: a storage configured to store at least one software; a communicator configured to communicate with a server; and a controller configured to download an update file from the server upon receiving an update notification message during a standby mode, and to update the at least one software stored in the storage using the downloaded update file when the standby mode switches to a normal mode.

The controller may recognize strength of a signal received by the communicator upon receiving the update notification message, download the update file when the recognized signal strength is equal to or higher than reference signal strength, and store update notification message information when the recognized signal strength is less than the reference signal strength.

The controller may determine whether the update notification message information is stored when switching to the normal mode, and download the update file from the server upon determination that the update notification message information is stored.

The controller may download the update file from the server upon receiving the update notification message during the normal mode, and update the at least one software stored in the storage using the downloaded update file.

The controller may determine whether a current time is a predetermined time when an OFF mode switches to the normal mode, and download an undownloaded update file from the server when the current time is the predetermined time.

In accordance with another aspect of the present disclosure, a vehicle includes: a storage configured to store at least one software needed to perform at least one function; a communicator configured to communicate with a server; and a controller configured to perform a standby mode when the vehicle stops driving, to download an update file from the server upon receiving an update notification message during the standby mode, to perform a normal mode when the vehicle starts driving, and to update the at least one software stored in the storage using the downloaded update file during the normal mode.

The communicator may wirelessly communicate with an external terminal at a remote site; and the controller may confirm strength of a signal received by the communicator upon receiving the update notification message during a remote service mode, and store update notification message information when the confirmed signal strength is less than reference signal strength.

The controller may download an update file from the server when the confirmed signal strength is equal to or higher than the reference signal strength.

The vehicle may further include: an input configured to receive a selection command of the remote service mode.

The controller may perform the remote service mode when switching to the standby mode.

The controller may perform the normal mode when the vehicle starts driving, determines whether the update notification message is stored, may download the update file from the server when the update notification message information is stored, and may update the at least one software stored in the storage using the downloaded update file.

The controller may stop downloading of the update file when a remote service mode is selected during downloading of the update file in the normal mode, and may re-download the update file when the remote service mode is released.

The vehicle may further include: a rechargeable power-supply configured to provide power to the storage, the communicator, and the controller with power, wherein the controller switches the standby mode to an OFF mode on the basis of a charge amount of the power-supply.

If the vehicle starts driving in the OFF mode and thus switches to the normal mode, the controller may determine whether a current time is a predetermined time, and download an undownloaded update file from the server when the current time is the predetermined time.

The predetermined time may include any one of an automatic diagnostic time, a manual diagnostic time, and a regular inspection time.

In accordance with another aspect of the present disclosure, a vehicle includes: a communicator configured to communicate with a server; a storage configured to store at least one software; and a controller configured to confirm whether a current time is a predetermined time when the vehicle starts driving, to determine the presence or absence of an undownloaded update file by accessing the server when the current time is the predetermined time, to download the undownloaded update file when the presence of the undownloaded update file is determined, and to update the at least one software stored in the storage using the downloaded update file.

In accordance with another aspect of the present disclosure, a method for controlling a vehicle configured to store software needed to perform at least one function includes: performing a standby mode when the vehicle stops driving; upon receiving an update notification message during the standby mode, storing the received update notification message information; performing a normal node when the vehicle starts driving; determining the presence or absence of stored update notification message information during the normal mode; downloading an update file from the server when the presence of the stored update notification message information is determined; and updating the software using the downloaded update file.

The method may further include: determining whether a remote service mode is selected during the standby mode; upon receiving the update notification message when the remote service mode is selected, confirming strength of a signal received by the communicator; storing update notification message information when the confirmed signal strength is less than reference signal strength; and downloading an update file from the server when the confirmed signal strength is equal to or higher than the reference signal strength.

The method may further include: determining whether a current time is a predetermined time when the vehicle starts driving; downloading an undownloaded update file from the server when the current time is the predetermined time; and updating the software using the downloaded update file.

The predetermined time may include any one of an automatic diagnostic time, a manual diagnostic time, and a regular inspection time.

The method may further include: stopping downloading of the update file when a remote service mode is selected during downloading of the update file in the normal mode; and re-downloading the update file when the remote service mode is released.

The method may further include: determining whether the update file is being downloaded when a remote service mode is selected during the normal mode; and displaying download information of the currently-downloaded update file when the update file is being downloaded.

The method may further include: determining whether a remote service mode is selected in the standby mode; upon receiving the update notification message on the condition that the remote service mode is selected, confirming capacity of an update file; if the confirmed capacity is equal to or higher than reference capacity, storing update notification message information; and if the confirmed capacity is less than the reference capacity, downloading the update file from the server.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
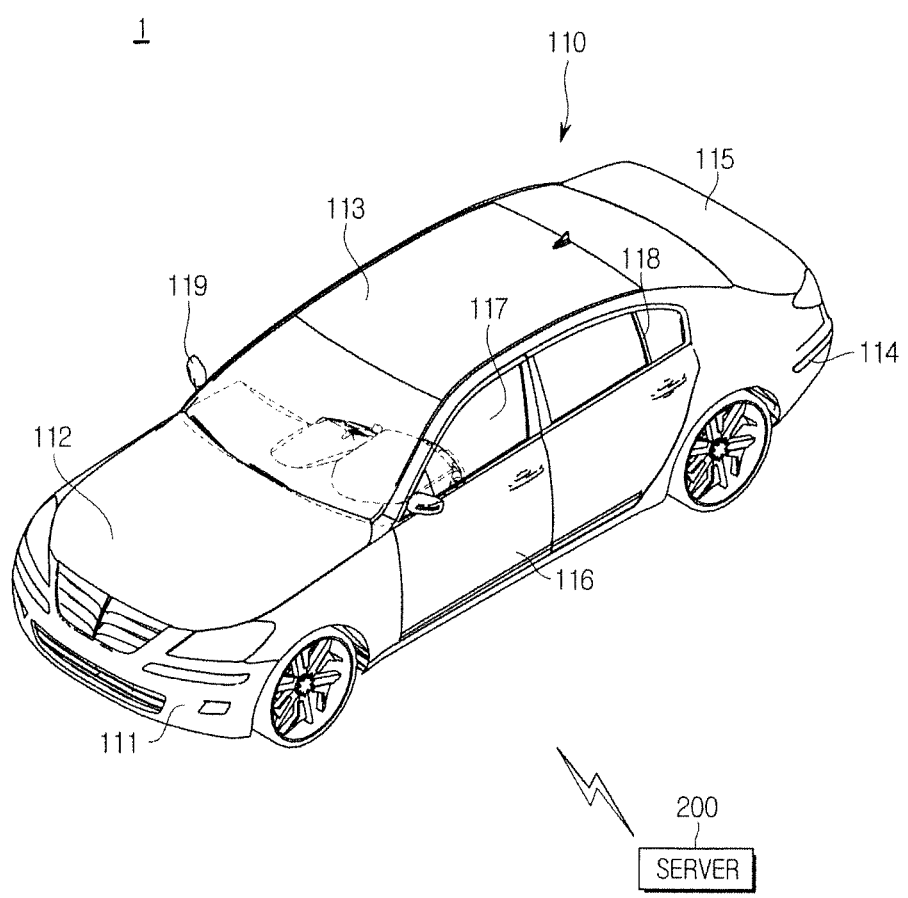
FIG. 1 is a view illustrating an appearance of a vehicle according to an embodiment of the present disclosure.

Reference will now be made in detail to the embodiments of the present disclosure, examples of which are illustrated in the accompanying drawings, wherein like reference numerals refer to like elements throughout.

Figure 2:
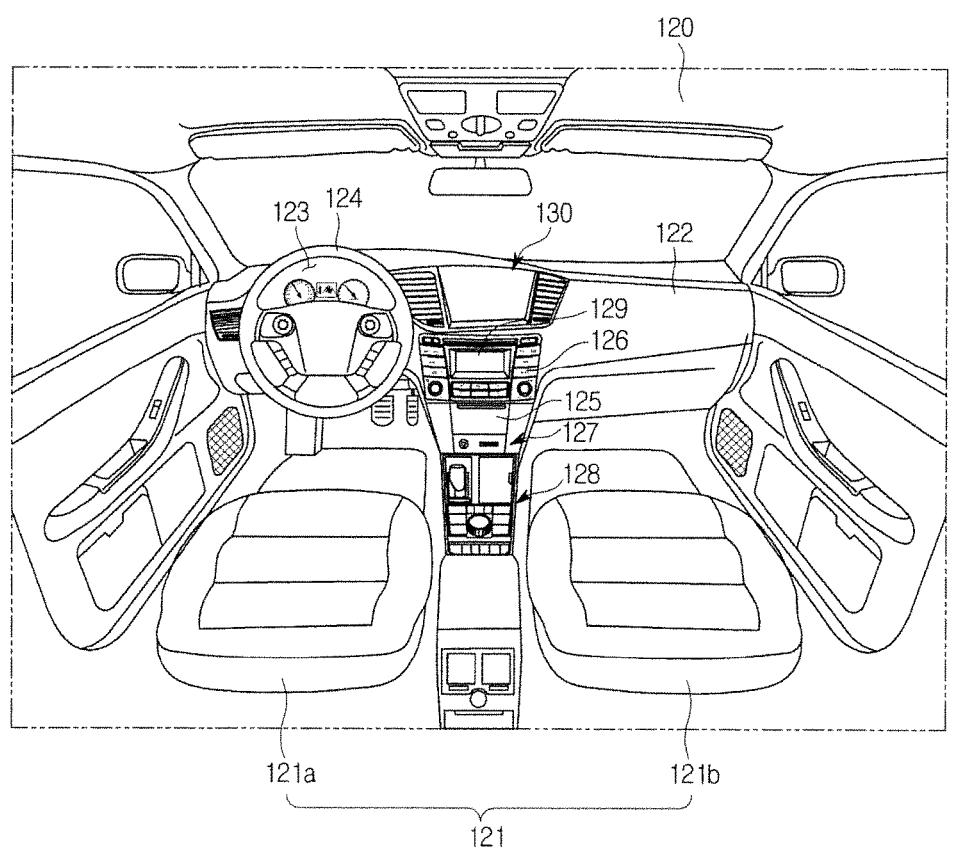
FIG. 2 is a view illustrating an internal structure of the vehicle according to an embodiment of the present disclosure.

FIG. 1 is a view illustrating an appearance of a vehicle according to an embodiment of the present disclosure. FIG. 2 is a view illustrating an internal structure of the vehicle according to an embodiment of the present disclosure.

A vehicle 1 is an apparatus to move on the road by driving of vehicle wheels for the purpose of transporting persons or cargo.

The vehicle 1 may include a body having interior and exterior parts, and a chassis which is a remaining portion other than the body and is equipped with mechanisms required for driving thereof.

Referring to FIG. 1, the exterior part 110 of the body may include a front panel 111, a bonnet 112, a roof panel 113, a rear panel 114, a trunk 115, and front-rear and left-right doors 116.

The exterior part 110 of the body may include the front panel, the bonnet, the roof panel, the rear panel, the trunk, and the front-rear and left-right doors 116, and may further include window glasses 117 installed at the front-rear and left-right doors 116, and pillars 118 provided at boundaries between the front-rear and left-right doors 116.

In addition, the window glasses installed at the front-rear and left-right doors 116 may further include side window glasses, quarter window glasses which are installed between the pillars so as not to be openable and closable, a rear window glass installed to the rear part, and a front window glass installed to the front part.

The exterior part 110 of the vehicle may further include side-view mirrors 119 to provide a rear view of the vehicle 1 to a vehicle driver.

Referring to FIG. 2, the interior part 120 of the vehicle includes seats (121: 121a, 121b) on which a passenger is seated, a dashboard 122, an instrument panel 123 (i.e., a cluster) (including a tachometer, a speedometer, a coolant thermometer, a fuel gauge, a turn signal indicator, a high beam indicator light, a warning light, a seat belt warning light, a mileage indicator, an odometer, an automatic transmission shift indicator, a door open warning light, an engine oil warning light, a fuel shortage warning light, which are arranged on the dashboard to output information related to driving), a steering wheel 124 to adjust a traveling direction of the vehicle, and a center fascia 125 extended from the dashboard 122 to the vicinity of the seats 121.

The seats 121 may include a driver's seat 121a for a driver, a passenger seat 121b for a fellow passenger, and a rear seat arranged in the rear of the vehicle 1.

The seats 121 may include heating elements therein.

The cluster 123 may be implemented as a digital cluster. The digital cluster may visually display vehicle information and traveling information.

The center fascia 125 may include a head unit 126 disposed between the driver's seat 121a and the passenger seat 121b from among the dashboard 122.

That is, the head unit 126 may be connected to a variety of loads needed to perform various functions (e.g., an audio function, a radio function, an air-conditioning function, a heating function of the seats, a navigation function, a DMB function, a telephone function, etc.), such that the head unit 126 may receive an operation command for performing each function, may control respective functions according to the received operation command or may transmit the operation command to the corresponding load.

The center fascia 125 may include an air vent, a cigarette lighter receptacle, a multi-port 127, etc. therein.

The multi-port 127 may be located adjacent to the head unit 126, and may further include a USB port, an AUX port, and a Secure Digital (SD) slot.

The vehicle 1 may further include an input 128 configured to receive an operation command of at least one function from among a plurality of functions capable of being executed in the vehicle 1. The vehicle 1 may further include a display 129 configured to display not only information regarding the executed function but also user-input information.

The input 128 may be provided in the head unit 126, and may include an ON-OFF button of respective functions and at least one physical button (such as a button for changing the setting values of respective functions).

The input 128 may be provided in the center fascia 125. In this case, the input 128 may be implemented as a jog dial (not shown) or touchpad through which the user can input a movement command of a cursor displayed on the display of a terminal 130, a selection command, etc.

The display 129 may be implemented as a flat panel display, for example, a Liquid Crystal Display (LCD) panel, a Light Emitting Diode (LED) panel, an Organic Light Emitting Diode (OLED) panel, etc., without being limited thereto.

The center fascia 125 may include the terminal (or UE) 130 for receiving information from the user and outputting the result corresponding to the user-input information.

The terminal 130 (or UE) may include an input and a display. If at least one of a navigation function, a DMB function, an audio function, a video function, a telephone function, and a radio function is selected, the terminal 130 may perform the selected function and may display operation information of the executed function.

The input of the terminal 130 may include a touchpanel incorporated with the display of the terminal 130.

The input of the terminal 130 may be implemented as a button and then displayed on the display of the terminal 130. In this case, the input of the terminal 130 may receive position information of the displayed button.

The input and the display of the terminal 130 may be implemented as a touchscreen.

A stationary-type terminal may be installed onto the dashboard.

The terminal 130 may be a user equipment (UE) communicating with the vehicle 1.

That is, the UE may be a tablet PC, a mobile phone, a smartphone, a laptop, or a PDA.

The chassis of the vehicle may further include a power generation system, a power transmission system, a traveling system, a steering system, a brake system, a suspension system, a speed change system, a fuel supply device, and front-rear and left-right wheels.

The vehicle 1 may further include various safety devices configured to guarantee safety of the vehicle driver and passengers.

There are various kinds of vehicle safety devices, for example, an airbag control device for safety of the driver and passengers during vehicle collision, an electronic stability control (ESC) device for stabilizing vehicle orientation during acceleration or cornering of the vehicle, etc.

Additionally, the vehicle 1 may include a variety of sensing devices, for example, a proximity sensor to detect the presence or absence of obstacles or other vehicles located at the lateral and rear directions of the vehicle 1, a rain sensor to detect the presence or absence of rainfall and the amount of rainfall, etc.

The vehicle 1 may selectively include a hands-free device for driver convenience, an audio device and a Bluetooth device, a rear-view camera, a UE charging device, and a high-pass device.

The vehicle 1 may further include an ignition button configured to input an operation command to the starter motor (not shown).

That is, if the ignition button is switched on, the vehicle 1 may operate the starter motor (not shown), and may drive the engine (not shown) acting as the power generation device using the starter motor.

The vehicle 1 may include a power generation system, a power transmission system, a traveling system, a steering system, a brake system, a suspension system, a speed change system, a fuel supply device, and an electronic control unit (ECU) 140 (shown in FIG. 3) for controlling driving of various safety devices and various sensors, and may further include a drive unit 150 (shown in FIG. 3) configured to operate various devices on the basis of a command of the ECU 140.

The ECU 140 may control at least one of an air-conditioner, heating elements of the seats, indoor lighting, a headlight, a display 129, a starter motor, and a telematics device 160 on the basis of a command applied to the input 128 or a command received by the communicator 161.

The vehicle 1 may further include the telematics device 160 (shown in FIG. 3) configured to perform location tracking, Internet access, remote vehicle diagnosis, accident sensing, transportation information, and a communication service related to a home network over a communication and broadcast network.

The telematics device 160 may directly communicate with the server, or may communicate with the server through a base station (BS).

The telematics device 160 may allow a user to diagnose the vehicle through a wireless network at a remote site, may allow the user to use various information (e.g., transportation and living information, emergency relief information, etc.), may transmit a telephone message to another party, may allow the user to transmit/receive a voice mail to/from another party, and may download an audio book as necessary.

The telematics device 160 may perform various services according to service types, for example, a news reception, stock price, electronic commerce (E-commerce), financial transactions, hotel reservation, facsimile transmission/reception, games, and a car accident and car theft notification service. Specifically, if a traffic accident occurs, the telematics device 160 may automatically track the position of the accident vehicle using GPS such that it can transmit the position of the accident vehicle to the nearest 911 Rescue Center.

The telematics device 160 may communicate with various kinds of electronic devices embedded in the vehicle, and may also communicate with a user equipment (UE) acting as an external terminal.

The telematics device 160 may include a CAN communication module, a Wi-Fi communication module, a USB communication module, and a Bluetooth communication module.

In addition, the telematics device 160 may further include a GPS reception module to acquire position information from a satellite, and may further include a broadcast communication module such as DMB Transport Protocol Experts Group (TPEG), SXM, and RDS.

The vehicle 1 may further include a power-supply 170 (shown in FIG. 3) electrically connected to various electronic devices such that the driving power is supplied to the electronic devices. For example, the electronic devices may include a terminal (or UE), an audio device, indoor lighting, heating elements of the seats, a starter motor, a telematics device, headlights, an ECU, and other electronic devices.

The power-supply 170 is a chargeable/dischargeable battery, and performs charging using a self-generator or engine power during vehicle traveling.

Constituent components of the vehicle 1 will hereinafter be described with reference to FIG. 3.

Figure 3:
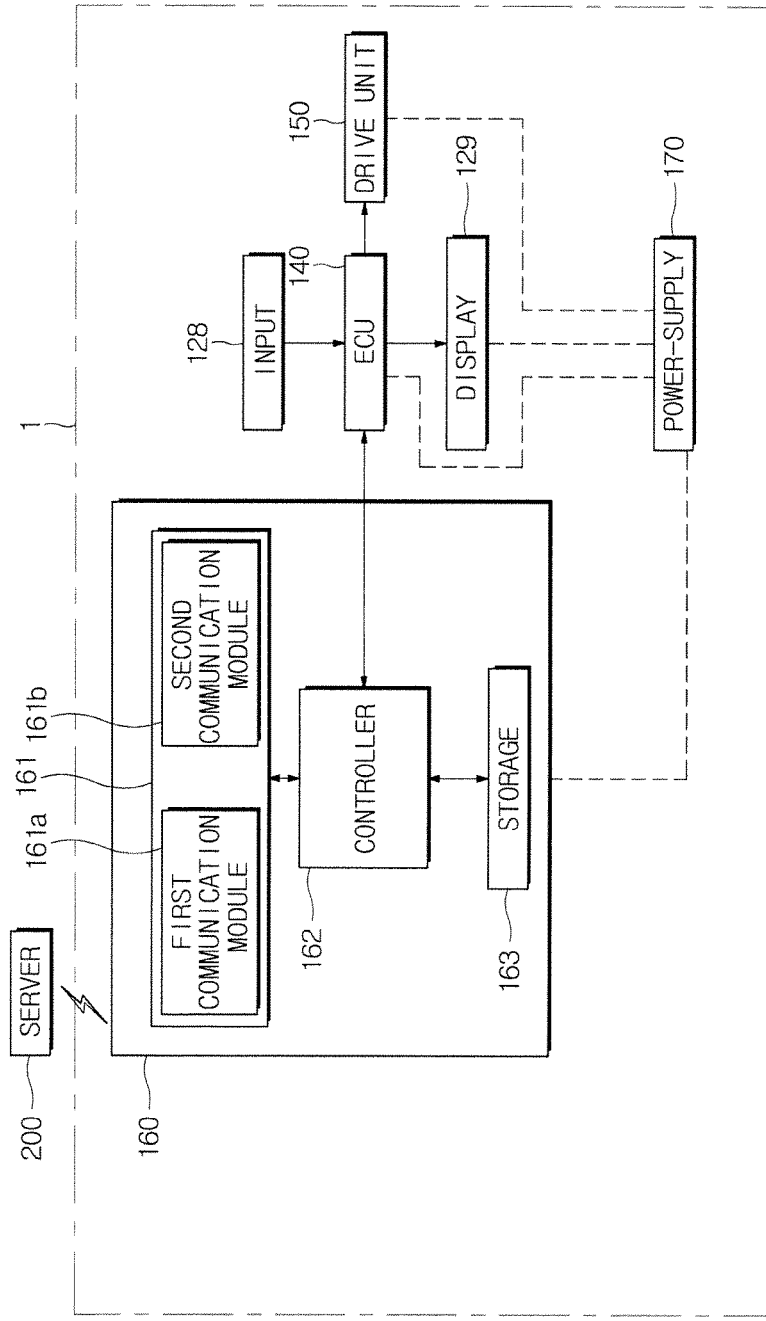
FIG. 3 is a block diagram illustrating a vehicle according to an embodiment of the present disclosure.

FIG. 3 is a block diagram illustrating a vehicle according to an embodiment of the present disclosure.

Referring to FIG. 3, the vehicle 1 may include an input 128, a display 129, an electronic control unit (ECU) 140, a drive unit 150, a telematics device 160, and a power-supply 170.

The input 128 may allow the user to select a remote service mode, and may receive a delay command of the remote service mode.

The input 128 may also receive an update command of at least one software package from the user.

The display 129 may display selection or release information of the remote service mode.

The display 129 may display information regarding the update notification message, and may also output download information of the update file.

In this case, the download information of the update file may include information of the corresponding software, an update file name, a total time consumed for download, an elapsed time, the remaining time, total size of the update file, downloaded amount, and the remaining amount, and may further include a download date or the like.

The download information of the update file may be displayed in the form of a progress bar.

The display 129 may also display download interruption information of the update file, and may display re-download information of the update file.

The ECU 140 may enter a normal mode (an active mode) from a standby mode when the vehicle starts driving. If the vehicle stops driving, the ECU 140 may switch to standby mode, and may transmit a signal indicating the standby mode to the telematics device 160.

If the remote service mode is selected through the input 128 during the standby mode, the ECU 140 may also transmit the selection signal of the remote service mode to the controller of the telematics device 160.

The ECU 140 may control the power-supply 170 during the standby mode such that power is supplied only to the telematics device 160 and is not supplied to the remaining constituent elements other than the telematics device 160.

If the vehicle starts driving, the ECU 140 may control the power-supply 170 to provide the electronic devices with driving power.

Upon receiving an operation command signal during the remote service mode, the ECU 140 may control at least one device on the basis of the received command signal.

The ECU 140 may enter a normal mode upon receiving a wake-up signal from the controller of the telematics device 160.

The ECU 140 may control at least one of the air-conditioner, heating elements of the seats, the indoor lighting, the headlight, the display 129, the starter motor, and the telematics device 160 on the basis of a command applied to the input 128 or a command received by the communicator 161.

The drive unit 150 may drive at least one device on the basis of a control command of the ECU 140.

In this case, the at least one device may include a power generation system, a power transmission system, a traveling system, a steering system, a brake system, a suspension system, a speed change system, a fuel supply device, various safety devices, and various sensors.

The drive unit 150 may drive the starter motor on the basis of a control command of the ECU 140 during the remote service mode, such that the vehicle starts driving, indoor lighting is turned on, or heating elements of the seats or the air-conditioners start operation.

The telematics device 160 may receive power from the power-supply 170 during the standby mode, and may communicate with at least one of the server 200, a UE, and a remote controller.

The telematics device 160 may include a communicator 161, a controller 162, and a storage 163.

The communicator 161 may include a first communication module 161a to receive a software file and an update file by communicating with the server 200, and a second communication module 161b to perform the remote service mode by communicating with at least one of the UE and the remote controller.

In this case, the first communication module 161a and the second communication module 161b may employ the same or different communication schemes.

If the vehicle starts driving, the controller 162 may enter a normal mode. If the vehicle stops operation, the controller 162 may enter the standby mode. In addition, the controller 162 may receive a signal of the normal mode and a mode signal of the standby mode from the ECU 160.

If a predetermined time elapses from the execution time of the standby mode, the controller 162 may switch to the OFF mode.

If the remote service mode is not performed, the controller 162 may switch to the OFF mode after lapse of a first time. If the remote service mode is performed, the controller 162 may switch to the OFF mode after lapse of a second time.

The controller 162 may also automatically perform the remote service mode upon receiving the operation command of the standby mode.

Upon receiving the update notification message when a current mode is a normal mode, the controller 162 may download the update file on the basis of the received update notification message information, and then update the corresponding software upon completing download of the update file.

In this case, the update notification message may include a Firmware Over The Air (FOTA) update notification message.

The controller 162 may stop download of the update file when the remote service mode is selected during download of the update file in a normal mode state, and may re-download the update file when the remote service mode is released.

The controller 162 may determine whether the update file is being downloaded when the remote service mode in the normal mode is selected, and may control the display to display download information of the update file that is being downloaded.

Upon receiving the update notification message from among the standby mode, the controller 162 may store information of the received update notification message.

If the standby mode is switched to the normal mode, the controller 162 may determine the presence or absence of a stored update notification message. If the stored update notification message is present, the controller 162 may download the update file from the server, and may update the software using the downloaded update file.

The controller 162 may determine whether the remote service mode in the standby mode is selected. Upon receiving the update notification message when the remote service mode is selected, the controller 162 may confirm the strength of a signal received by the communicator 161. If the confirmed signal strength is less than reference signal strength, the controller 162 may store the update notification message information. If the confirmed signal strength is equal to or higher than the reference signal strength, the controller 162 may download the update file from the server.

If the vehicle starts driving in the OFF mode state, the controller 162 may determine whether a current time is a predetermined time. If the current time is set to the predetermined time, the controller 162 may download an undownloaded update file from the server, and may update software using the downloaded update file.

In this case, the predetermined time may include any one of an automatic diagnostic time, a manual diagnostic time, and a regular inspection time, may further include a user-selected time, and may also include a predetermined time as necessary.

The controller 162 may request a download confirmation message of the update file from the server 200. In this case, if the server 200 provides update file information for each software package, the controller 162 may compare the per-software update file information stored in the server 200 with the update file information stored in the storage 163, and thus recognize the presence or absence of an undownloaded update file.

The controller 162 may also request the undownloaded update file from the server 200.

The controller 162 may determine whether the remote service mode from among the standby mode is selected. Upon receiving the update notification message on the condition that the remote service mode is selected, the controller 162 may confirm capacity of the update file. If the confirmed capacity is equal to or higher than reference capacity, the controller 162 may store the update notification message information. If the confirmed capacity is less than the reference capacity, the controller 162 may also download the update file from the server.

The controller 162 may control download of the update file on the basis of a mobile communication scheme.

For example, if the communication scheme is the 3G communication scheme, the controller 162 may store only information of the update notification message. If the communication scheme is the LTE communication scheme, the controller 162 may also download the update file.

If the communication scheme is the 3G communication scheme, the controller 162 may confirm capacity of the update file. If the confirmed capacity is equal to or higher than reference capacity, the controller 162 may receive and store only information of the update notification message. If the confirmed capacity is less than the reference capacity, the controller 162 may download the update file.

If the communication scheme is the LTE communication scheme, the controller 162 may confirm the signal strength of the received signal. If the confirmed signal strength is equal to or higher than the reference signal strength, the controller 162 may download the update file. If the confirmed signal strength is less than the reference signal strength, the controller 162 may receive and store only the update notification message information.

The controller 162 may switch a current mode to the OFF mode on the basis of the charge amount of the power-supply 170, or may switch to the OFF mode after lapse of a predetermined time.

The controller 162 of the telematics device 160 may also be embedded in the ECU 140.

The controller 162 may be a Central Processing Unit (CPU) or MCU, or may be a processor.

The storage 163 may store software needed to perform at least one function. If the stored software is updated on the basis of a command of the controller 162, the storage 163 may store the updated software.

The storage 163 may also store the update files in the order of download dates.

The storage 163 may store a predetermined time needed to switch from the standby mode to the OFF mode.

The storage 163 may store a predetermined time for switching from the standby mode to the OFF mode, and may store not only a first time needed when the remote service mode is not performed, but also a second time needed when the remote service mode is performed as necessary.

The storage 163 may also store reference capacity therein.

The storage 163 may be provided independently from the telematics device 160.

The storage 163 may include at least one of a volatile memory and a non-volatile memory. The volatile memory may be an SRAM or DRAM, and the non-volatile memory may include at least one of flash memory, Read Only Memory (ROM), Erasable Programmable Read Only Memory (EPROM), Electrically Erasable Programmable Read Only Memory (EEPROM), etc.

The power-supply 170 may provide various kinds of electronic devices with the driving power during the normal mode, may provide the telematics device 160 with the driving power during the standby mode, and may prevent all the constituent elements from being powered on during the OFF mode.

In addition, the power-supply 170 may provide only the communication module for receiving the door opening signal with power during the OFF mode.

The vehicle 1 may further include a charge-amount detector (not shown) that detects the charge amount of the power-supply and transmits the detected charge amount to the controller 162.

In this case, the server 200 may communicate with the pre-registered vehicle 1.

The server 200 may store a software file to perform at least one function and an update file for each software package, may transmit an update notification message to the vehicle whenever the update file is generated, and may transmit the update file to the corresponding vehicle 1 upon receiving a request for providing the update file from the vehicle 1.

The server 200 may also provide update file information for each software package when a confirmation message of an update file undownloaded from the vehicle 1 is requested, such that the server may also provide the update file information for each software to the vehicle 1.

The server 200 may store downloaded update file information for each vehicle, and may provide the undownloaded update file to the vehicle on the basis of the stored downloaded update file information for each vehicle.

Figure 4:
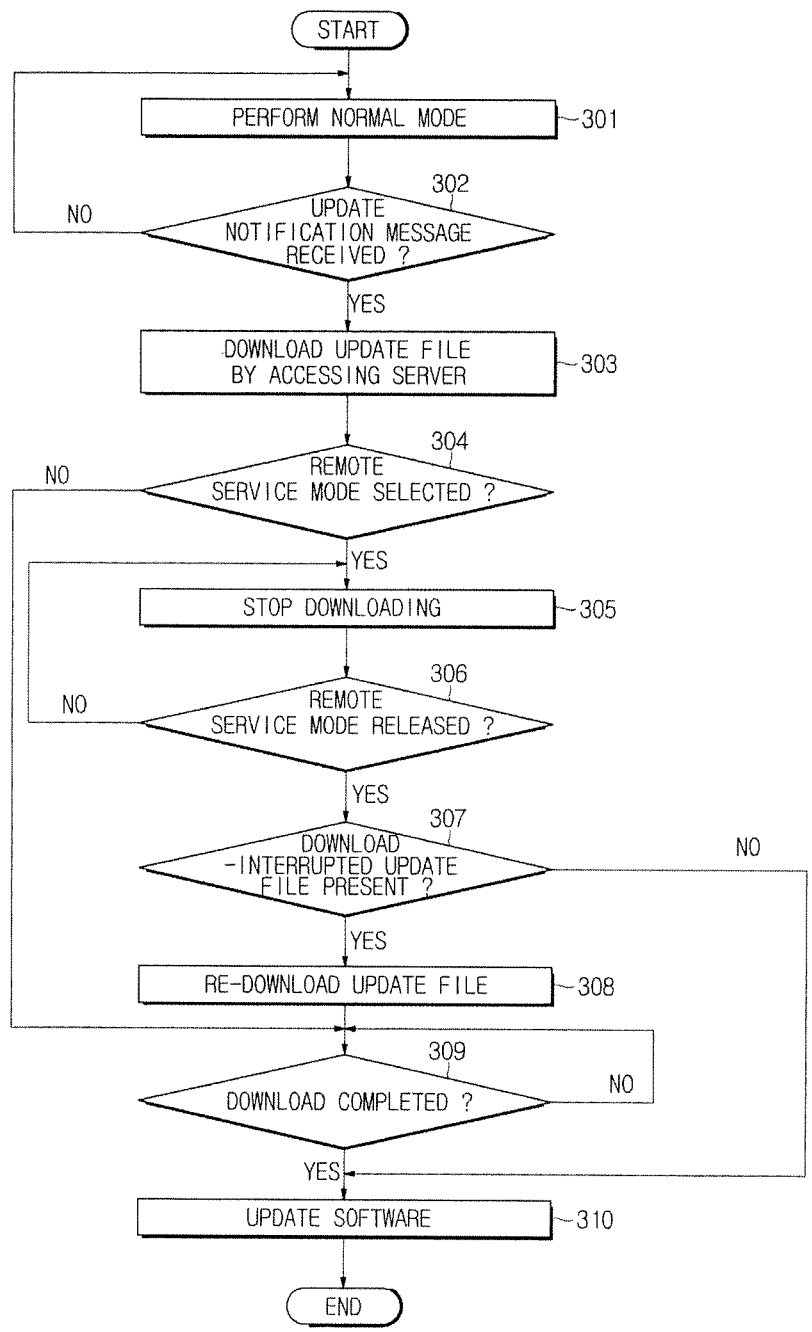
FIGS. 4 to 8 are flowcharts illustrating control methods for updating software for different modes of the vehicle according to embodiments of the present disclosure.

FIG. 4 is a flowchart illustrating a software update control method during a normal mode of the vehicle.

Referring to FIG. 4, if the vehicle starts driving, a normal mode is performed in operation 301, and it is determined whether the update notification message is received during the normal mode in operation 302.

Upon receiving the update notification message, the vehicle may display the received update notification message information, may access the server 200, and may download the update file on the basis of the received update notification message information in operation 303.

The vehicle may determine whether a current mode switches to the standby mode while simultaneously downloading the update file. If it is determined that the current mode switches to the standby mode, the vehicle may determine whether the remote service mode is selected in operation 304.

If the remote service mode is selected during download of the update file, the vehicle may stop download of the update file in operation 305.

In this case, the vehicle may also display download interruption information of the update file through the display.

That is, if the selection signal of the remote service mode is received during download of the update file, the downloading state of the update file is displayed on the display, such that it may be possible to inform the user of the download information of the update file.

In this case, the download information of the update file may include information indicating the presence or absence of the update file, the remaining time from among the download time of the update file, and the remaining capacity from among the download capacity of the update file.

In addition, the vehicle may confirm the remaining time from among the download time of the update file, and may also perform the remote service mode after lapse of the remaining time.

That is, the vehicle may also delay the operation for entering the remote service mode.

In addition, the user may also select specific information indicating the presence or absence of the delaying of the remote service mode.

For example, the vehicle may determine whether the remote service mode will be immediately performed through the input, or may determine whether the remote service mode will be performed upon completing download of the update file.

The vehicle may determine whether the remote service mode is released in operation 306. If the remote service mode is released, the vehicle may re-download the interrupted update file.

Herein, the operation for determining whether the remote service mode is released may include determining whether the release signal of the remote service mode is input through the input.

The operation for determining whether the remote service mode is released may include determining whether the vehicle starts driving.

In more detail, if the remote service mode is released, the vehicle may determine the presence or absence of the download-interrupted update file in operation 307. If the download-interrupted update file is present, the vehicle may re-download the update file from the server in operation 308.

The operation for re-downloading the interrupted update file may include re-downloading all the update files, or downloading the update file starting from the download-interrupted data from among the update file.

Upon completing download of the update file in operation 309, the vehicle may disconnect from the server, and may update the corresponding software stored in the storage using the downloaded update file in operation 310.

Figure 5:
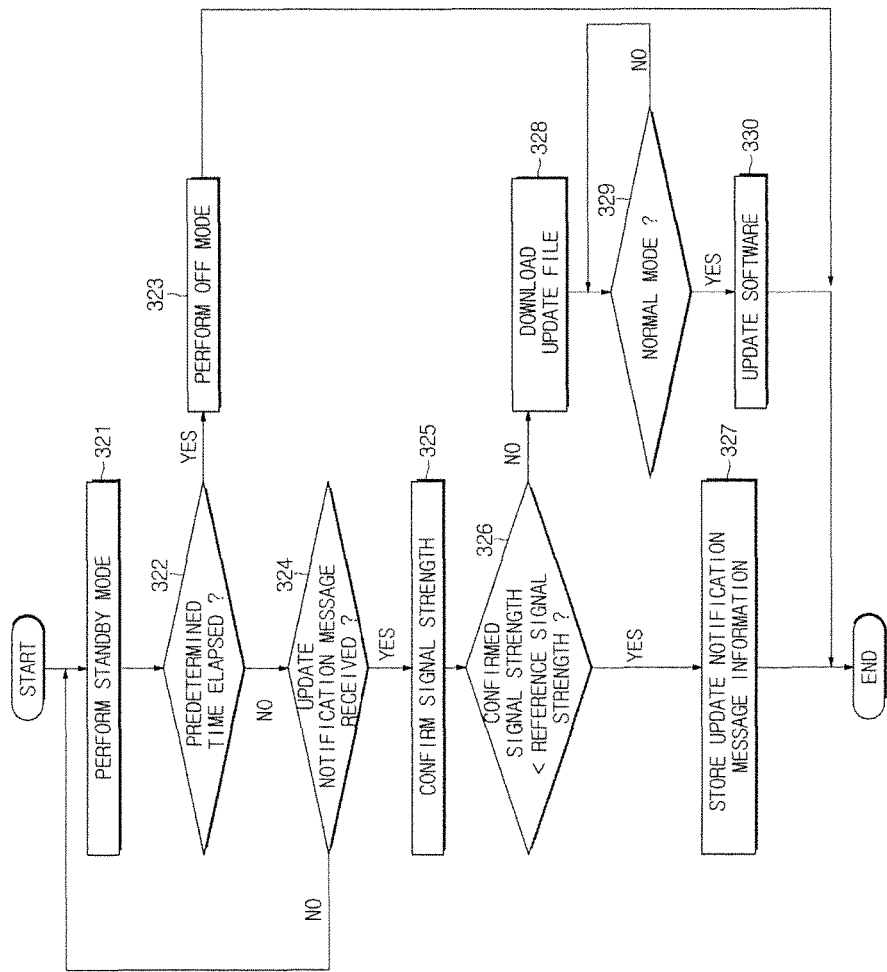

FIG. 5 is a flowchart illustrating a software update control method during a standby mode of the vehicle.

Referring to FIG. 5, if the vehicle stops driving, the standby mode is carried out in operation 321. That is, the vehicle may provide only the telematics device 160 with power.

The vehicle drives only the telematics device during the standby mode, such that the vehicle can wirelessly communicate with the server, the terminal (UE) and the remote controller.

The vehicle may count a time starting from the standby mode execution time, and may determine whether the counted time is longer than a predetermined time in operation 322. If the counted time is longer than the predetermined time in operation 322, the vehicle may perform the OFF mode in operation 323.

If the counted time is shorter than or equal to the predetermined time in operation 322, the vehicle may determine whether the update notification message is received during the standby mode in operation 324. If the update notification message is received, the vehicle may display information regarding the received update notification message.

In addition, upon receiving the update notification message, the vehicle may recognize the strength of the signal received by the first communication module of the communicator in operation 325, and may determine whether the recognized signal strength is less than reference signal strength in operation 326.

In this case, the received signal strength may include a Received Signal Strength Indication (RSSI).

Upon receiving the update notification message, the vehicle may determine whether the communication scheme is the LTE communication scheme. If the communication scheme is the LTE communication scheme, it may also be possible to recognize the strength of the received signal.

If the recognized signal strength is less than reference signal strength, the vehicle may store information regarding the received update notification message in operation 327.

If the update notification message is received, the vehicle may determine whether the communication scheme is the LTE communication scheme. If the communication scheme is 3G communication scheme, the vehicle may also store information regarding the received update notification message without recognizing the strength of the received signal.

If the recognized signal strength is equal to or higher than the reference signal strength, the vehicle may access the server, and may download the update file on the basis of information regarding the received update notification message in operation 328.

If the vehicle starts driving during the standby mode and thus switches to the normal mode, the vehicle may update the software using the downloaded update file in operation 330.

If the normal mode is performed, the vehicle may determine the presence or absence of the stored update notification message. If the stored update notification message information is present, the vehicle may download the update file from the server and thus update the software.

Figure 6:
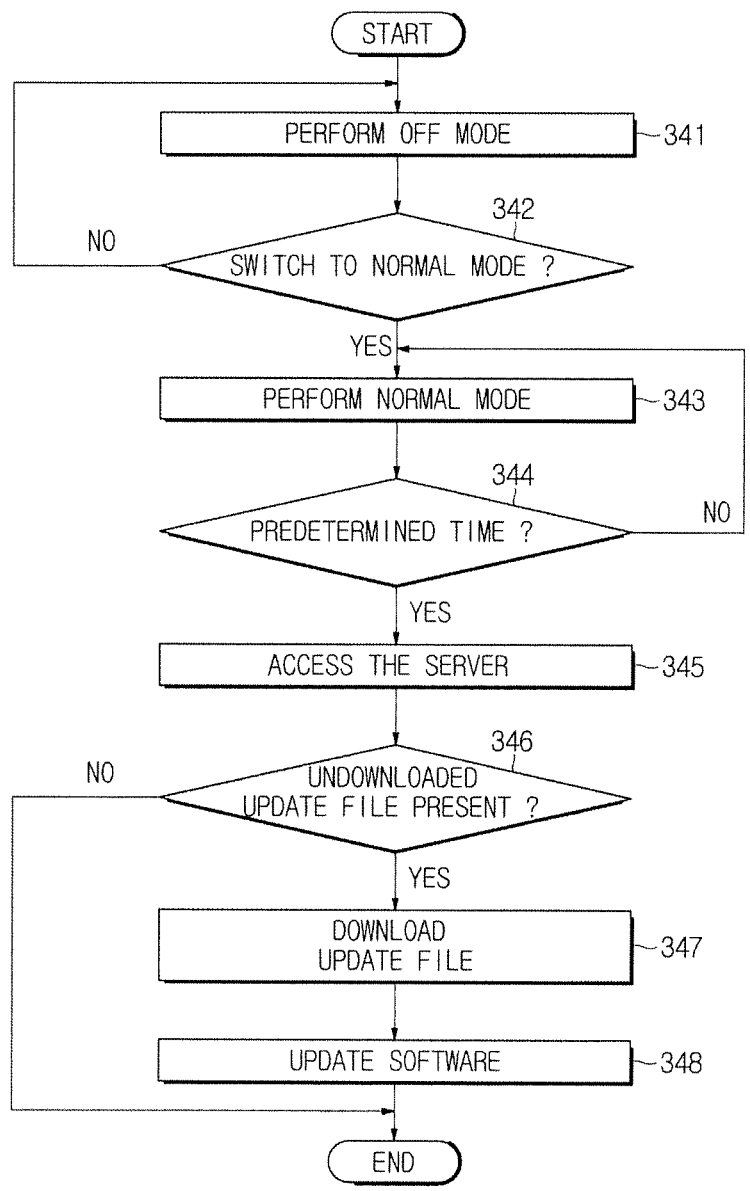

FIG. 6 is a flowchart illustrating a software update control method when the vehicle switches from the OFF mode to the normal mode according to an embodiment of the present disclosure.

Referring to FIG. 6, if the vehicle stops driving and a predetermined time elapses, the vehicle may perform the OFF mode in operation 341.

If the vehicle starts driving, the vehicle switches from the OFF mode to the normal mode in operation 342, and enters the normal mode in operation 343.

If the normal mode is performed, the vehicle may determine whether the current time is a predetermined time in operation 344. If the current time is set to the predetermined time, the vehicle may access the server in operation 345.

The vehicle may determine the presence or absence of an undownloaded update file by accessing the server 200 in operation 346. If the undownloaded update file is present, the vehicle may download the update file in operation 347. Upon completing download of the update file, the vehicle may disconnect from the server 200 and then update the corresponding software using the downloaded update file in operation 348.

In more detail, the vehicle may confirm update information for each software package and may also confirm update information of each software package stored in the server 200.

The vehicle determines the presence or absence of update-interrupted software from among the software embedded in the vehicle. If the presence of update-interrupted software is determined, the vehicle may download the update file needed to update the update-interrupted software.

In this case, the vehicle may display download information of the update file and update information of the software on the display.

Figure 7:
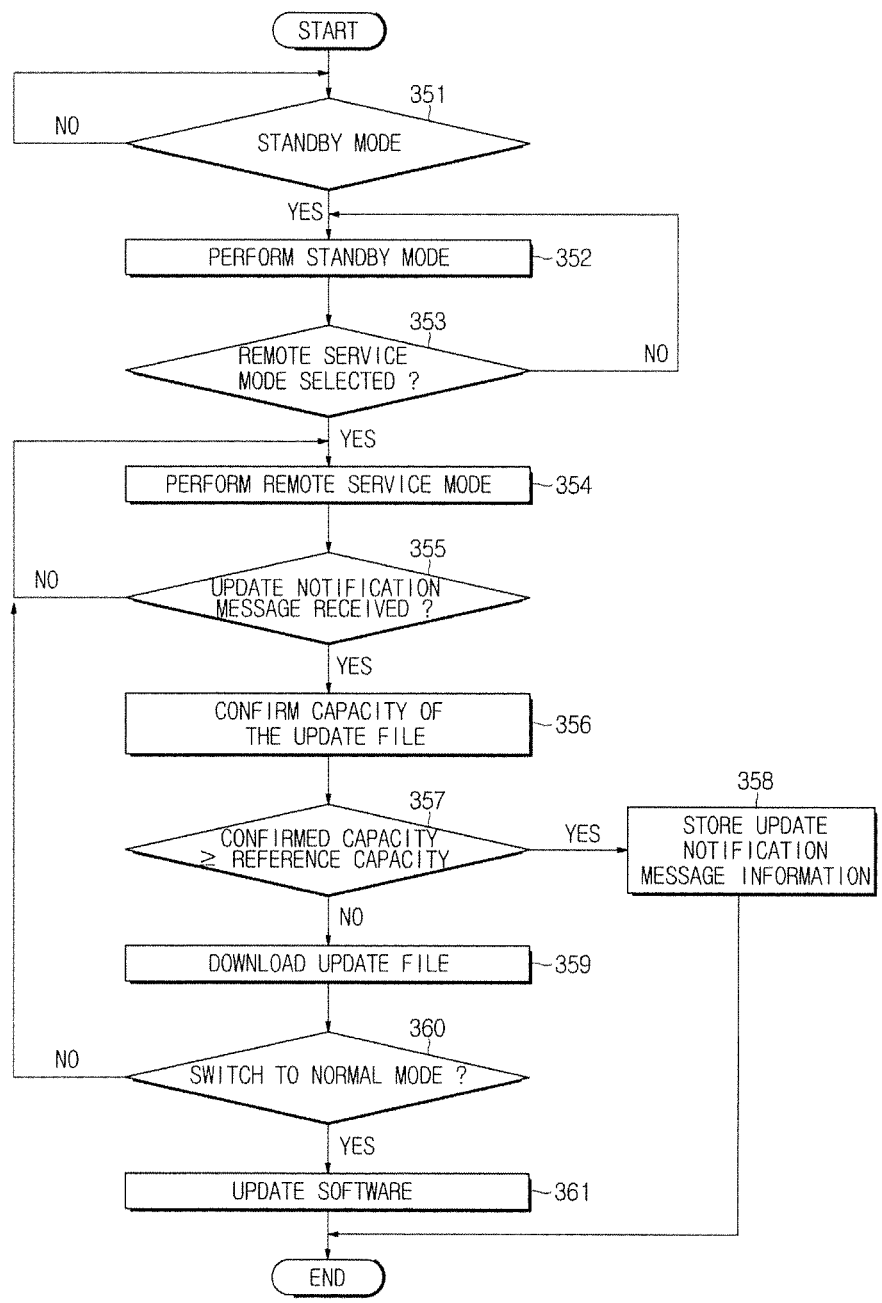

FIG. 7 is a flowchart illustrating a software update control method during the standby mode of the vehicle or during the remote service mode.

Referring to FIG. 7, the vehicle may determine whether the current mode is the standby mode in operation 351.

In this case, the operation for determining whether the current mode is the standby mode may include determining whether the vehicle stops driving.

That is, if the vehicle stops driving, the vehicle may enter the standby mode in operation 352.

In this case, the vehicle may provide only the telematics device 160 with power.

The vehicle may power only the telematics device during the standby mode, such that it can wirelessly communicate with the server, the terminal (UE) and the remote controller.

The vehicle may determine whether the remote service mode is selected while simultaneously in the standby mode in operation 353. If the remote service mode is selected, the vehicle may perform the remote service mode in operation 354.

The remote service mode may be input through the input.

The operation for entering the remote service mode may include starting operation of the vehicle by allowing the user to manipulate the terminal or the remote controller remotely, turning heating elements of the seats on or off, or turning an air-conditioner on or off.

The vehicle may determine whether the update notification message is received while simultaneously in the remote service mode in operation 355. If the update notification message is received, the vehicle may confirm the size of the update file on the basis of information regarding the received update notification message in operation 356. The vehicle may determine whether the confirmed size of the update file is equal to or higher than the reference size in operation 357. If the confirmed size of the update file is equal to or higher than the reference size, the vehicle may store only information regarding the update notification message in operation 358.

The vehicle may also display information regarding the update notification message on the display.

If the confirmed capacity of the update file is less than the reference capacity, the vehicle may access the server, and may download the update file on the basis of the received update notification message information in operation 359.

That is, the vehicle may perform download only when the update file is small in size, such that the number of problems encountered in the remote service mode can be minimized. If the update file is large, the vehicle may store only information regarding the update notification message, and may download the update file when starting operation, such that power consumption of the power-supply can be minimized.

If the current mode switches to the normal mode in operation 360, the vehicle may update the corresponding software using the downloaded update file in operation 361.

The vehicle may determine the presence or absence of stored update notification message information. If the stored update notification message information is present, the vehicle may download the update file from the server. Upon completing download of the update file, the vehicle may disconnect from the server, and may update the corresponding software using the downloaded update file.

The vehicle may count a time starting from the standby mode execution time, and may determine whether the counted time is longer than a predetermined time. If the counted time is longer than the predetermined time, the vehicle may enter the OFF mode.

In this case, the predetermined time is a duration time through which the charge amount of the power-supply reaches the reference charge amount when the vehicle performs the remote service mode in the standby mode, and the predetermined time may be shorter than a specific time in which the standby mode switches to the OFF mode.

Figure 8:
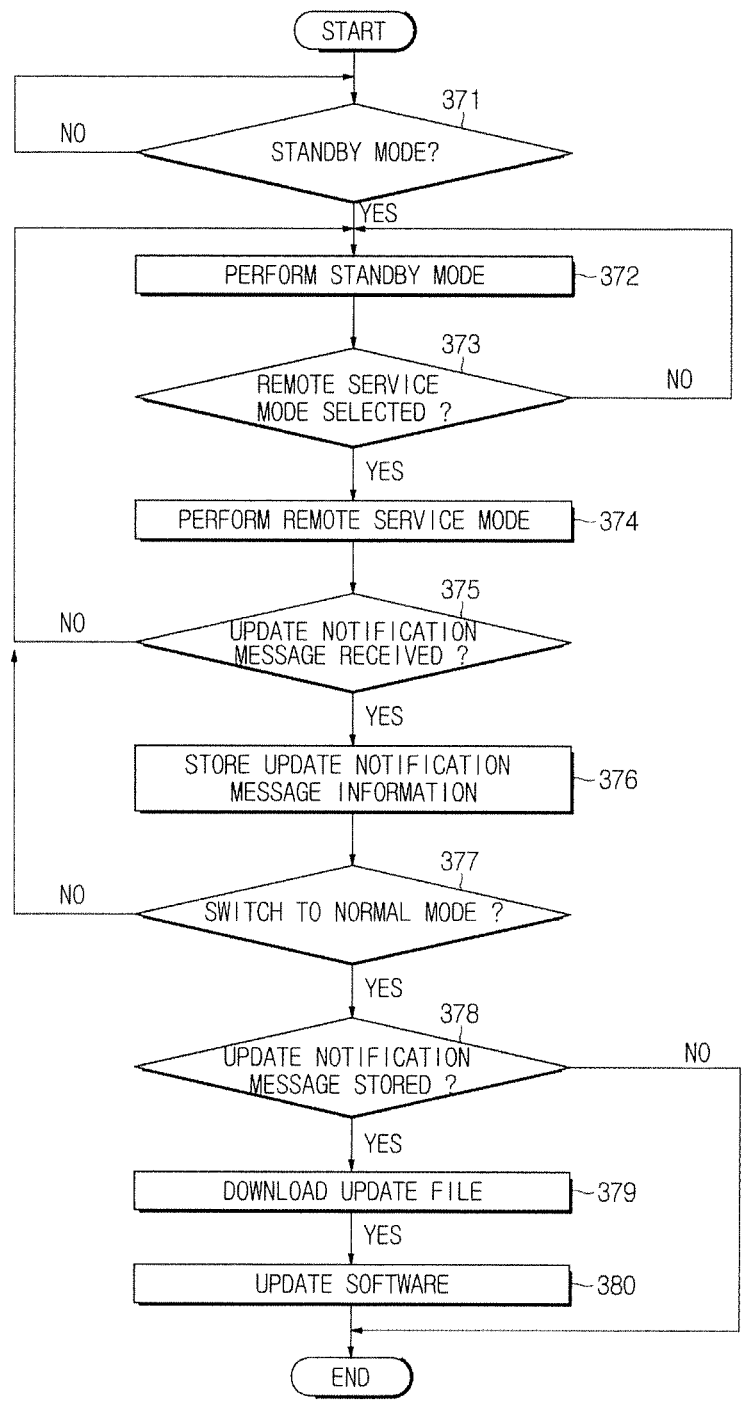

FIG. 8 is a flowchart illustrating a software update control method during the standby mode of the vehicle or during the remote service mode, differently from the software update control method of FIG. 7.

Referring to FIG. 8, the vehicle may determine whether the current mode is the standby mode in operation 371. The operation for determining whether the current mode is the standby mode may include determining whether the vehicle stops driving.

That is, if the vehicle stops operation, the vehicle may enter the standby mode in operation 372.

In this case, the vehicle may provide only the telematics device 160 with power.

If the current mode is the standby mode, the vehicle may operate only the telematics device, such that the vehicle can wirelessly communicate with the server, the terminal, and the remote controller.

The vehicle may determine whether the remote service mode is selected while simultaneously in the standby mode. If the remote service mode is selected, the vehicle may perform the remote service mode in operation 374.

In this case, the remote service mode may be input through the input.

The operation for entering the remote service mode may include starting operation of the vehicle by allowing the user to manipulate the terminal or the remote controller remotely, turning heating elements of the seats on or off, or turning an air-conditioner on or off.

The vehicle may determine whether the update notification message is received while simultaneously in the remote service mode in operation 375. If the update notification message is received, the vehicle may store information regarding the received update notification message in operation 376.

In addition, the vehicle may also display information regarding the update notification message on the display.

If the vehicle switches from the standby mode to the normal mode in operation 377, the vehicle may determine whether the update notification message is stored in operation 378. If the update notification message information is stored, the vehicle may download the update file from the server in operation 379. Upon completing download of the update file, the vehicle may disconnect from the server, and may update the corresponding software using the downloaded update file in operation 380.

Figure 9:
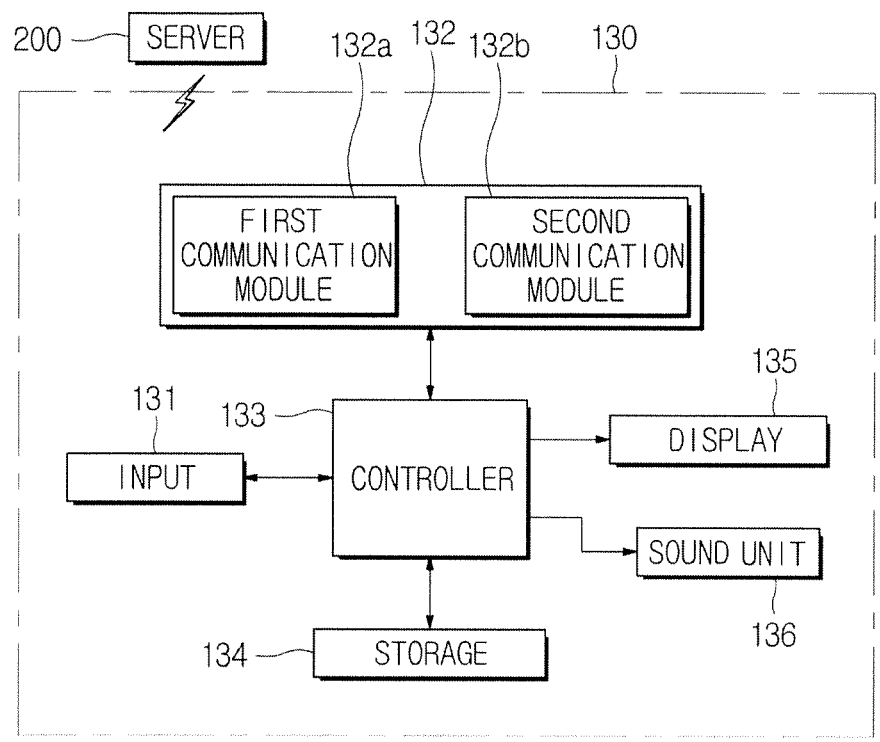
FIG. 9 is a block diagram illustrating a terminal (or UE) according to another embodiment of the present disclosure.

FIG. 9 is a block diagram illustrating a terminal (or UE) according to another embodiment of the present disclosure.

Referring to FIG. 9, the terminal may include a terminal for vehicles and a user equipment (UE).

The terminal may further include an input 131, a communicator 132 including a first communication module 132a and a second communication module 132b, a controller 133, a storage 134, a display 135, a sound unit 136, and a power-supply (not shown).

The input 131 may receive the power-supply ON/OFF command, may receive a selection command of at least one function, may receive a selection command of the remote service mode, and may receive a delay command of the remote service mode.

The input 131 may receive an update command of at least one software as an input.

The communicator 132 may receive a power-supply signal from the power-supply (not shown) during the standby mode, and may communicate with the server 200.

That is, the communicator 132 may receive the software file and the update file by communicating with the server 200.

The communicator 132 may also transmit a request signal for providing update information upon receiving a command signal from the controller 133.

If the terminal is powered on, the controller 133 may enter the normal mode. If the terminal is powered off, the controller 133 may enter the standby mode.

The controller 133 may provide only the communicator 132 with power by controlling the power-supply (not shown) during the standby mode, and may prevent constituent components other than the communicator 132 from being powered off.

If the terminal is powered on, the controller 133 may control the power-supply (not shown) to provide electronic devices with driving power.

The controller 133 may switch to the OFF mode on the basis of the charge amount of the power-supply during the standby mode.

Upon receiving the update notification message when the current mode is a normal mode, the controller 133 may download the update file on the basis of the received update notification message information, and may update the corresponding software upon completing download of the update file.

In this case, the update notification message may include an FOTA (Firmware Over The Air) update notification message.

The controller 133 may confirm the signal strength when downloading the update file. If the confirmed signal strength is less than reference signal strength, the controller 133 may stop downloading the update file, and may display download interruption information on the display 135.

If the signal strength is equal to or higher than the reference signal strength, the controller 133 may restart download of the download-interrupted update file, and may display re-download information.

Upon receiving the update notification message during the standby mode, the controller 133 may store information regarding the received update notification message. If the vehicle switches from the standby mode to the normal mode, the controller 133 may determine the presence or absence of the stored update notification message. If the stored update notification message information is present, the controller 133 may download the update file from the server, and may update the software using the downloaded update file.

Upon receiving the update notification message during the standby mode, the controller 133 may confirm a communication scheme of the communicator. If the download speed of the confirmed communication scheme is equal to or higher than a predetermined download speed, the controller 133 may also download the update file from the server.

In addition, if the download speed of the confirmed communication scheme is equal to or higher than a predetermined download speed, the controller 133 may confirm the strength of the received signal. If the confirmed signal strength is less than the reference signal strength, the controller 133 may store the update notification message information. If the confirmed signal strength is equal to or higher than the reference signal strength, the controller 133 may also download the update file from the server.

In addition, if the download speed of the confirmed communication scheme is less than a predetermined download speed, the controller 133 may store only information regarding the update notification message.

If the download speed of the confirmed communication scheme is less than a predetermined download speed, the controller 133 may confirm the capacity of the update file on the basis of the update notification message information. If the capacity of the update file is less than the reference capacity, the controller 133 may download the update file from the server. If the capacity of the update file is equal to or higher than the reference capacity, the controller 133 may store only the received update notification message information.

If the terminal is powered on in the OFF mode state, the controller 133 may determine whether the current time is a predetermined time. If the current time is the predetermined time, the controller 133 may download the undownloaded update file from the server, and may update the software using the downloaded update file.

In this case, the predetermined time may include any one of an automatic diagnostic time, a manual diagnostic time, and a regular inspection time, may further include a user-selected time, and may also include a predetermined time as necessary.

The controller 133 may request a download confirmation message of the update file from the server 200. In this case, if the server 200 provides update file information for each software package, the controller 133 may compare the per-software update file information stored in the server 200 with the update file information stored in the storage, and thus recognize the presence or absence of an undownloaded update file.

The controller 133 may also request the undownloaded update file from the server 200.

The controller 133 may be a Central Processing Unit (CPU) or MCU, or may be a processor.

The storage 134 may store software needed to perform at least one function. If the stored software is updated on the basis of a command of the controller 133, the storage 134 may store the updated software.

The storage 134 may also store the update files in the order of download dates.

The storage 134 may store a predetermined time needed to switch from the standby mode to the OFF mode, and may also store reference capacity of the update file therein.

The storage 134 may include at least one of a volatile memory and a non-volatile memory. The volatile memory may be an SRAM or DRAM, and the non-volatile memory may include at least one of flash memory, Read Only Memory (ROM), Erasable Programmable Read Only Memory (EPROM), Electrically Erasable Programmable Read Only Memory (EEPROM), etc.

The display 135 may display an image regarding at least one function, and may display selection or release information of the remote service mode.

The display 135 may display information regarding the update notification message, and may also output download information of the update file.

In this case, the download information of the update file may include information of the corresponding software, an update file name, a total time consumed for download, an elapsed time, the remaining time, total size of the update file, downloaded amount, and the remaining amount, and may further include a download date or the like.

The download information of the update file may be displayed in the form of a progress bar.

The display 135 may also display download interruption information of the update file, and may display re-download information of the update file.

The display 135 may be implemented as a flat panel display, and may be incorporated with the input 131. In this case, the input 131 may be implemented as a touchpanel.

The input and the display may be implemented as a touchscreen.

The power-supply (not shown) may provide all the constituent elements with power during the normal mode, and may provide only the communicator with power during the standby mode.

The terminal (or UE) may further include the charge amount detector (not shown) that detects the charge amount of the power-supply and transmits the detected charge amount to the controller 162.

In this case, the server 200 may communicate with the pre-registered terminal (or UE).

The server 200 may store the software to perform at least one function, may store the update file for each software package, and may transmit the update notification message to the terminal 130 whenever the update file is generated. Upon receiving a request signal for providing the update file from the terminal 130, the server 200 may transmit the update file to the corresponding terminal 130.

The server may also provide update file information for each software package to the terminal upon receiving a request for confirming the undownloaded update file from the terminal 130.

The server 200 may store update file information downloaded for each terminal, and may provide the undownloaded update file to the terminal on the basis of the stored update file information downloaded for each terminal.

As is apparent from the above description, the embodiments of the present disclosure can normally perform a remote service mode upon receiving a Firmware Over The Air (FOTA) update notification message during a standby mode needed to perform the remote service mode, and at the same time can download only the update file needed for the update function, such that power consumption can be reduced in the standby mode.

In addition, when the standby mode is switched to a normal mode, the embodiments can update the corresponding software using the downloaded file. Therefore, the embodiments can minimize the number of update non-execution times caused by non-reception of the update notification message.

In addition, the embodiments can automatically access the server at a predetermined time (e.g., a diagnostic time, a regular inspection, etc.) during a normal mode so as to confirm the presence or absence of software to be updated, and can update the confirmed software, such that the embodiments can also normally update another software package, when an update notification message of which is not received from the server due to occurrence of an OFF mode.

The embodiments can update software embedded in the vehicle even when the vehicle performs long-term parking, such that the embodiments can normally perform at least one of various functions of the vehicle and can also perform at least one function at an optimum state.

The embodiments can improve quality of a terminal (or UE) and vehicle, can increase user satisfaction, and can also improve user convenience and vehicle safety.

Although a few embodiments of the present disclosure have been shown and described, it would be appreciated by those skilled in the art that changes may be made in these embodiments without departing from the principles and spirit of the present disclosure, the scope of which is defined in the claims and their equivalents.

What is claimed is:

1. A method for controlling a vehicle configured to store software, comprising:
performing a standby mode when the vehicle stops driving;
upon receiving an update notification message during the standby mode, storing update notification message information contained in the received update notification message;
switching the standby mode to an OFF mode based on an amount of power in a rechargeable power-supply;
performing a normal node when the vehicle starts driving;
determining presence or absence of stored update notification message information during a normal mode;
downloading an update file from a server when the presence of the stored update notification message information is determined; and
updating the software using the downloaded update file,
wherein performing the standby mode comprises:
confirming a size of an update file upon receiving the update notification message information,
when the size of the update file is equal to or higher than a reference size, storing the update notification message information to minimize an amount of power consumed when communicating with the server, and
when the size of the update file is less than the reference size, downloading the update file from the server,
wherein the performing the normal mode comprises updating the software using the downloaded update file during the standby mode, and
wherein the reference size is a size of an update file that is received using a predetermined amount of power.

2. The method according to claim 1, wherein the performing the standby mode further comprises:
determining whether a remote service mode is selected;
upon receiving the update notification message when the remote service mode is selected, confirming a signal strength of a signal received by a communicator;
storing the update notification message information to minimize an amount of power consumed when communicating with the server when the confirmed signal strength is less than a reference signal strength; and
downloading the update file from the server when the confirmed signal strength is equal to or higher than the reference signal strength.

3. The method according to claim 1, further comprising:
determining whether a current time is a predetermined time when the vehicle starts driving;
downloading an undownloaded update file from the server when the current time is the predetermined time; and
updating the software using the downloaded update file.

4. The method according to claim 3, wherein the predetermined time includes any one of an automatic diagnostic time, a manual diagnostic time, and a regular inspection time.

5. The method according to claim 1, further comprising:
stopping downloading of the update file when a remote service mode is selected during downloading of the update file in the normal mode; and
re-downloading the update file when the remote service mode is released.

6. The method according to claim 1, further comprising:
determining whether the update file is being downloaded when a remote service mode is selected during the normal mode; and
displaying download information of the update file currently being downloaded.

7. A terminal comprising:
a rechargeable power-supply;
a memory storage configured to store at least one software;
a communicator configured to communicate with a server; and
a controller configured to update the at least one software stored in the memory storage using a downloaded update file when a current mode of the terminal is a normal mode,
wherein the controller is configured to switch from a standby mode to an OFF mode based on an amount of power charged in the power-supply during the standby mode, download the update file from the server or store update notification message information of the update file based on a size of the update file to minimize an amount of power consumed by communication with the server upon receiving an update notification message during the standby mode, to determine whether the update notification message information is stored when switching to the normal mode, and to download the update file from the server upon determination that the update notification message information is stored,
wherein, when the size of the update file is equal to or higher than a reference size, the controller stores the update notification message information, and when the size of the update file is less than the reference size, the controller downloads the update file from the server, and
wherein the reference size is a size of an update file that is received using a predetermined amount of power.

8. The terminal according to claim 7, wherein:
the controller downloads the update file from the server upon receiving the update notification message during the normal mode, and updates the at least one software stored in the memory storage using the downloaded update file.

9. The terminal according to claim 7, wherein:
the controller determines whether a current time is a predetermined time when OFF mode switches to the normal mode, and downloads an undownloaded update file from the server when the current time is the predetermined time.

10. A vehicle comprising:
a rechargeable power-supply;
a storage configured to store at least one software;
a communicator configured to communicate with a server; and
a controller configured to operate in a standby mode when the vehicle stops driving, to operate in a normal mode when the vehicle starts driving, to update the at least one software stored in the storage using a downloaded update file when a current mode of the controller is the normal mode, and to switch a standby mode to an OFF mode based on an amount of power charged in the power-supply when the current mode of the controller is the standby mode,
wherein the controller is configured to download the update file from the server or to store update notification message information of the update file based on a size of the update file to minimize an amount of power consumed by communication with the server upon receiving an update notification message during the standby mode, to determine whether the update notification message information is stored when switching to the normal mode, and to download the update file from the server upon determination that the update notification message information is stored,
wherein, when the size of the update file is equal to or higher than a reference size, the controller stores the update notification message information, and when the size of the update file is less than the reference size, the controller downloads the update file from the server, and
wherein the reference size is a size of an update file that is received using a predetermined amount of power.

11. The vehicle according to claim 10, wherein:
the communicator wirelessly communicates with an external terminal at a remote site.

12. The vehicle according to claim 11, further comprising:
an input configured to receive a selection command of a remote service mode.

13. The vehicle according to claim 11, wherein the controller performs a remote service mode when switching to the standby mode.

14. The vehicle according to claim 10, wherein:
the controller stops downloading of the update file when a remote service mode is selected during downloading of the update file in the normal mode, and re-downloads the update file when the remote service mode is released.

15. The vehicle according to claim 10, further comprising:
wherein, when the controller is in the standby mode, the rechargeable power-supply is configured to provide power to the storage, the communicator, and the controller.

16. The vehicle according to claim 15, wherein:
if the vehicle starts driving in the OFF mode and switches to the normal mode, the controller determines whether a current time is a predetermined time, and downloads an undownloaded update file from the server when the current time is the predetermined time.

17. The vehicle according to claim 16, wherein the predetermined time includes any one of an automatic diagnostic time, a manual diagnostic time, and a regular inspection time.

18. A vehicle comprising:
a rechargeable power-supply;
a communicator configured to communicate with a server;
a storage configured to store at least one software; and
a controller configured to confirm whether a current time is a predetermined time when the vehicle starts driving, to determine presence or absence of an undownloaded update file by accessing the server when the current time is the predetermined time, to download the undownloaded update file when the presence of the undownloaded update file is determined, and to update the at least one software stored in the storage using the downloaded update file,
wherein, when the vehicle stops driving, the controller confirms a size of the update file, when the size of the update file is equal to or higher than a reference size, the controller stores an update notification message information to minimize an amount of power consumed by communication with the server, and when the size of the update file is less than the reference size, the controller downloads the update file from the server,
wherein the reference size is a size of an update file that is received using a predetermined amount of power, and
wherein the predetermined time includes at least one of an automatic diagnostic time, a manual diagnostic time, a regular inspection time, and a user-set time.

19. The vehicle according to claim 18, wherein the controller determines whether the update notification message information is stored when the vehicle starts driving, downloads the update file from the server when the update notification message information is stored, and updates the at least one software stored in the storage using the downloaded update file.

20. A vehicle, comprising:
a rechargeable power-supply;
a storage configured to store at least one software;
a communicator configured to communicate with a server; and
a controller configured to operate in a standby mode when the vehicle stops driving, to operate in a normal mode when the vehicle starts driving, to update the at least one software stored in the storage using a downloaded update file when the controller is in the normal mode, and to switch a standby mode to an OFF mode based on an amount of power charged in the rechargeable power-supply during the standby mode when the current mode of the controller is the standby mode,
wherein the controller is configured to download the update file from the server or store update notification message information of the update file based on at least one of a communication scheme of the communicator and a size of the update file to minimize an amount of power consumed by communication with the server upon receiving an update notification message during the standby mode, and to determine whether the update notification message information is stored when switching to the normal mode, and to download the update file from the server upon determining that the update notification message information is stored, wherein,
when the communication scheme of the communicator is a first communication scheme and the size of the update file is equal to or higher than a reference size, the controller stores the update notification message information, and,
when the communication scheme of the communicator is the first communication scheme and the size of the update file is less than the reference size, the controller downloads the update file from the server, and
when the communication scheme of the communicator is a second communication scheme, the controller downloads the update file from the server, wherein a download speed in the second communication scheme is higher than a download speed in the first communication scheme, and wherein the reference size is a size of an update file that is received using a predetermined amount of power.

21. A vehicle comprising:
a rechargeable power-supply;
a storage configured to store at least one software;
a communicator configured to communicate with a server; and
a controller configured to operate in a standby mode when the vehicle stops driving, to operate in a normal mode when the vehicle starts driving, to update the at least one software stored in the storage using a downloaded update file when the controller is in the normal mode, and to switch the standby mode to an OFF mode based on an amount of power charged in the power supply during the standby mode when the current mode of the controller is the standby mode,
wherein the controller is configured to download the update file from the server or store update notification message information of the update file based on at least one of a communication scheme of the communicator, a size of the update file, and signal strength of a signal received by the communicator to minimize an amount of power consumed when communicating with the server upon receiving an update notification message during the standby mode, and to determine whether the update notification message information is stored when switching to the normal mode, and to download the update file from the server upon determining that the update notification message information is stored,
wherein, when a download speed of the communication scheme of the communicator is equal to or higher than a reference download speed, the controller downloads the update file from the server or stores the update notification message information of the update file based on the signal strength of the signal, and when the download speed of the communication scheme of the communicator is less than the reference download speed, the controller downloads the update file from the server or stores the update notification message information of the update file based on the size of the update file, and
wherein the reference size is a size of an update file that is received using a predetermined amount of power.

22. The vehicle according to claim 21,
wherein, when the download speed of the communication scheme of the communicator is equal to or higher than the reference download speed and the signal strength is less than a reference signal strength, the controller stores update notification message information, and when the download speed of the communication scheme of the communicator is equal to or higher than the reference download speed and the signal strength is equal to or higher than the reference signal strength, the controller downloads the update file from the server.

23. The vehicle according to claim 21,
wherein, when the download speed of the communication scheme of the communicator is less than the reference download speed and the size of the update file is equal to or higher than a reference size, the controller stores the update notification message information, and when the download speed of the communication scheme of the communicator is less than the reference download speed and the size of the update file is less than the reference size, the controller downloads the update file from the server.

* * * * *